(12) United States Patent
Chien et al.

(10) Patent No.: US 12,347,183 B2
(45) Date of Patent: Jul. 1, 2025

(54) METHOD FOR DETECTING DEFECT OF IMAGES AND ELECTRONIC DEVICE

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 425 days.

(21) Appl. No.: 18/092,053

(22) Filed: Dec. 30, 2022

(65) Prior Publication Data

US 2023/0419653 A1    Dec. 28, 2023

(30) Foreign Application Priority Data

Jun. 22, 2022   (CN) .................... 202210714246.X

(51) Int. Cl.
*G06V 10/98* (2022.01)
*G06N 3/094* (2023.01)
*G06V 10/82* (2022.01)

(52) U.S. Cl.
CPC ............. *G06V 10/98* (2022.01); *G06N 3/094* (2023.01); *G06V 10/82* (2022.01)

(58) Field of Classification Search
None
See application file for complete search history.

(56) References Cited

U.S. PATENT DOCUMENTS

| 2020/0372339 | A1* | 11/2020 | Che | H03M 7/3059 |
|---|---|---|---|---|
| 2021/0224606 | A1* | 7/2021 | Lee | G06N 3/045 |
| 2021/0374928 | A1* | 12/2021 | Hida | G06F 18/2148 |
| 2022/0076053 | A1* | 3/2022 | Gulsun | G06N 3/045 |
| 2022/0108434 | A1* | 4/2022 | Donahue | G06V 10/751 |

FOREIGN PATENT DOCUMENTS

| CN | 111383209 | 7/2020 |
|---|---|---|
| CN | 113658115 | 11/2021 |
| TW | I755213 | 2/2022 |

* cited by examiner

*Primary Examiner* — Leon Flores
(74) *Attorney, Agent, or Firm* — ScienBiziP, P.C.

(57) ABSTRACT

A method for detecting defect of images applied in an electronic device inputs flawless sample training images into an autoencoder, and calculates first latent feature by a coding layer of the autoencoder, and calculates first reconstructed images by a decoding layer, and calculates a first reconstruction error by a first preset error function. The electronic device trains the discriminator according to the flawless sample training images and first reconstructed images, and calculates an adversarial learning error, and calculates a sample error, determines an error threshold based on the sample error, and obtains testing sample images, and calculates second latent feature of the testing sample images by the coding layer, and calculates the second reconstructed images of the testing sample images by the decoding layer, and calculate a difference between the testing sample images and the second reconstructed images, thus a detection result of the testing sample images is determined.

20 Claims, 2 Drawing Sheets

METHOD FOR DETECTING DEFECT OF IMAGES AND ELECTRONIC DEVICE

This application claims priority to Chinese Patent Application No. 202210714246.X filed on Jun. 22, 2022, in China National Intellectual Property Administration, the contents of which are incorporated by reference herein.

FIELD

The subject matter herein generally relates to an image detection technology field, in particular, relates to a method for detecting defect of images and an electronic device.

BACKGROUND

In a field of industrial detection, in order to improve the quality of industrial products, before packaging the industrial products, the industrial products are usually inspected for certain defects. Due to limitations from network architecture and loss function of an autoencoder used by existing defect detection methods, images output by the autoencoder (after reconstructing original images) are blurred and not as clear as original images, and significant errors on the edges of objects exist in the images which are output. The accumulation of the errors can overwhelm subtle flaws in the output images and disable a highlighting of same. In addition, an error between the output image reconstructed by the autoencoder and the original image exists at the edge of objects. If a calculation is performed directly on the original images and reconstructed images it will be erroneous, and only obvious defects will be detected, small and subtle defects cannot be detected.

BRIEF DESCRIPTION OF THE DRAWINGS

Implementations of the present disclosure will now be described, by way of embodiment, with reference to the attached figures.

DETAILED DESCRIPTION

Figure 1:
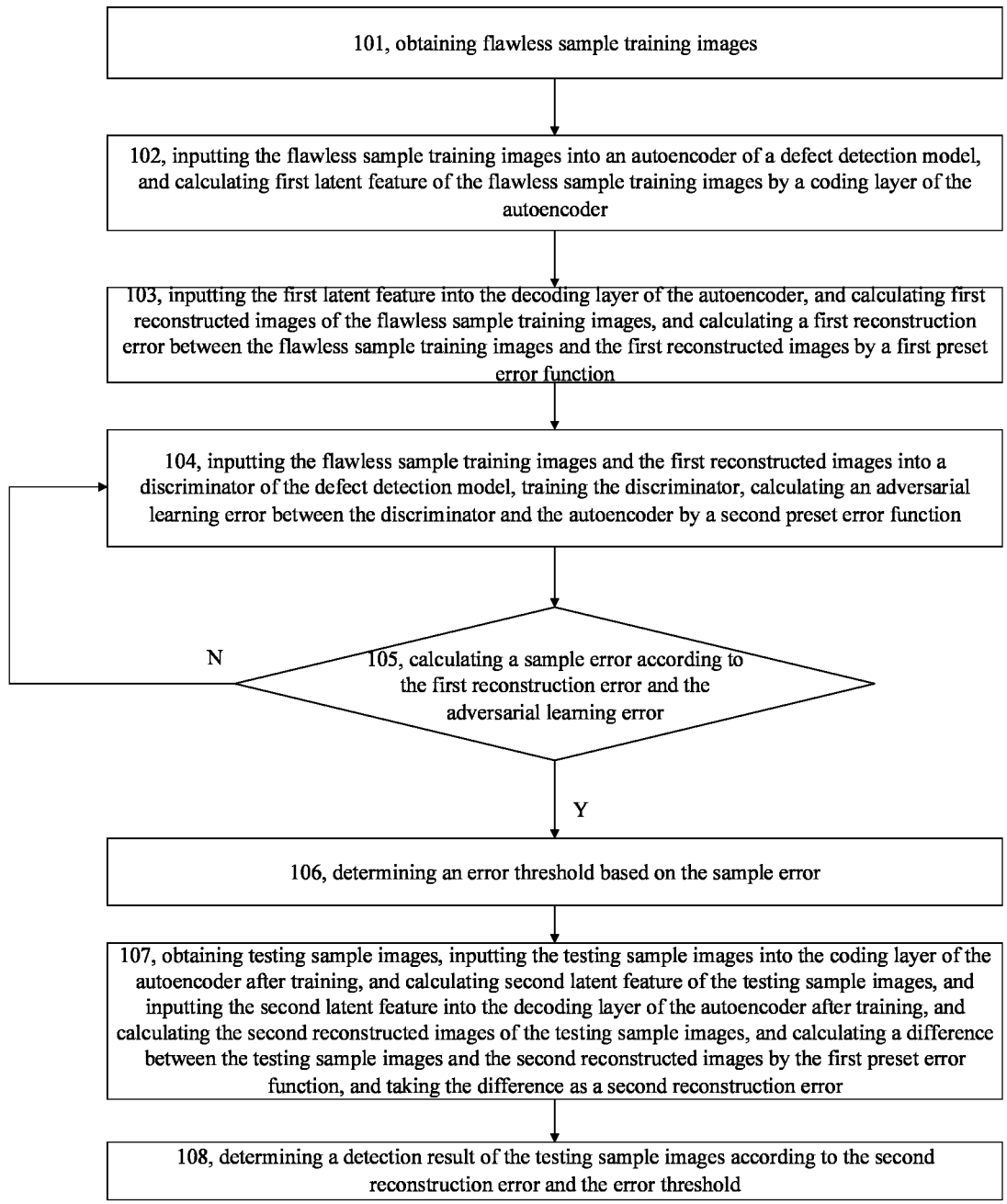
FIG. 1 is a flowchart of one embodiment of a method for detecting defect of images.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates the method for detecting defect of images. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining flawless sample training images.

In one embodiment, the flawless sample training images means that there is no defect apparent in the images. In one embodiment, the flawless sample training images are obtained by capturing images of different types of flawless products (such as computer casings, mobile phone casings, etc.). In one embodiment, the flawless sample training images are obtained by capturing images of the computer casings with no bumps, scratches, paint peeling, etc. The number of the flawless sample training images is not specifically limited in present disclosure.

At block 102, inputting the flawless sample training images into an autoencoder of a defect detection model, and calculating first latent feature of the flawless sample training images by a coding layer of the autoencoder.

In one embodiment, the autoencoder is a neural network that uses the backpropagation algorithm to make an output value equal to an input value. The autoencoder includes an encoder and a decoder. The encoder compresses input images into a latent space representation, and the decoder reconstructs the latent space representation into the output images.

In one embodiment, the encoder in the autoencoder includes hidden layers, one or more hidden layers can be regarded as the coding layer of the autoencoder, and a number of the multiple hidden layers can be set according to an application scenario.

In one embodiment, calculating first latent feature of the flawless sample training images by a coding layer of the autoencoder includes: performing vectorization processing on the flawless sample training images and obtaining feature vectors of the flawless sample training images, extracting the hidden layers corresponding to the coding layer; calculating the feature vectors by the hidden layers and obtaining the first latent feature.

In one embodiment, the calculating of the feature vectors by the hidden layers and obtaining the first latent feature includes: obtaining a weight matrix and bias values of the hidden layers, multiplying the feature vectors and the weight matrix to obtain an operation result, adding the operation result and the bias values and obtaining the first latent feature.

At block 103, inputting the first latent feature into the decoding layer of the autoencoder, and calculating first reconstructed images of the flawless sample training images, and calculating a first reconstruction error between the flawless sample training images and the first reconstructed images by a first preset error function.

In one embodiment, the input of the first latent feature into the decoding layer of the autoencoder and calculating the first reconstructed images of the flawless sample training images includes: performing calculation on the first latent feature by the decoding layer of the autoencoder to obtain intermediate vector, performing restoration processing on the intermediate vector and obtaining the first reconstructed images.

In one embodiment, the first preset error function can be $MSE=1/n\Sigma_{i=1}^{n}(x_i-x_l)^2$, $x_i$ is one first reconstructed image, xl is one flawless sample training image, n is a number of the first reconstructed images or the flawless sample training images.

At block 104, inputting the flawless sample training images and the first reconstructed images into a discriminator of the defect detection model, training the discriminator, and calculating an adversarial learning error between the discriminator and the autoencoder by a second preset error function.

In one embodiment, a training process of the autoencoder training is completed when process of the discriminator is completed. In one embodiment, the flawless training sample images are marked as true (true images) and the first reconstructed images are marked as false (false images), the discriminator is trained to distinguish between the true images and the false images. When the flawless training sample images are input into the autoencoder, the autoencoder is trained to generate the first reconstructed image corresponding to the flawless training sample images by learning characteristics from the flawless training sample images. The discriminator is trained to distinguish whether input images are the flawless training sample images or the first reconstructed images to obtain a distinguishing result, and feed the distinguishing result back to the autoencoder. The autoencoder and the discriminator are trained alternately until the first reconstructed image generated by the autoencoder can be no longer be distinguished from the true images, and an ability of the autoencoder and an ability of the discriminator reach a certain balance.

When the discriminator cannot distinguish between the true images and false images, that is, when the ability of the autoencoder and the ability of the discriminator reach a certain balance, and the training process of the discriminator is determined to be completed, the training process of the autoencoder is determined to be finished. In one embodiment, the adversarial learning error between the discriminator and the autoencoder is calculated by the second preset error function. In one embodiment, the second preset error function can be a Jensen-Shannon divergence function. For example, the second preset error function can be $$\min_{G} \max_{D} V(D, G) = I\!E_{X \sim P_{data}(x)}[\log D(X)] - I\!E_{Z \sim P_Z(Z)}[\log D(G(Z))].$$

At block 105, calculating a sample error according to the first reconstruction error and the adversarial learning error.

In one embodiment, the calculating of the sample error according to the first reconstruction error and the adversarial learning error includes: performing a weighted sum operation on the adversarial learning error and the first reconstruction error and obtaining the sample error.

In one embodiment, the adversarial learning error is 0.5, the first reconstruction error is 0.04, and a weighted sum of 0.5 and 0.04 is calculated. When the adversarial learning error accounts for 10% of the sample error and the first reconstruction error accounts for 90% of the sample error, the sample error is calculated according to 0.5*10%+0.04*90%=0.086.

In one embodiment, when the training process of the discriminator is completed and the training of the autoencoder is completed, it is determined that the sample error satisfies a first preset condition, and all sample errors are collected. When the sample error does not satisfy the first preset condition, the training process of the discriminator is continued to execute.

At block 106, determining an error threshold based on the sample error.

In one embodiment, the error threshold is determined based on the sample error when the sample error satisfies the first preset condition. In one embodiment, determining the error threshold based on the sample error includes: collecting all the sample errors, sorting the sample errors in an ascending order, and obtaining a total list of the sample errors and a serial number of each sample error; one sample error is selected from the total list according to a second preset condition as the error threshold.

In one embodiment, the selecting of one sample error as the error threshold from the total list of sample errors according to a second preset condition includes: calculating a number of sample errors, and multiplying the number and a configuration value to obtain a target value; selecting the sample error whose sample serial number is equal to the target value from the total list as the error threshold.

At block 107, obtaining testing sample images, inputting the testing sample images into the coding layer of the autoencoder after training, and calculating second latent feature of the testing sample images, and inputting the second latent feature into the decoding layer of the autoencoder after training, and calculating the second reconstructed images of the testing sample images, and calculating a difference between the testing sample images and the second reconstructed images by the first preset error function, and taking the difference as a second reconstruction error.

At block 108, determining a detection result of the testing sample images according to the second reconstruction error and the error threshold.

In one embodiment, the detection result includes that the testing sample images have defects and that the testing sample images have no defects.

In one embodiment, when the second reconstruction error is greater than or equal to the error threshold, it is determined that the testing sample images have defects; or when the second reconstruction error is less than the error threshold, it is determined that the testing sample images have no defects.

In one embodiment, the method further includes: displaying or recording the detection result.

Since the second reconstruction error is numerically compared with the error threshold, subtle defects in the test sample images can be detected, so as to improve the accuracy of defect detection.

Figure 2:
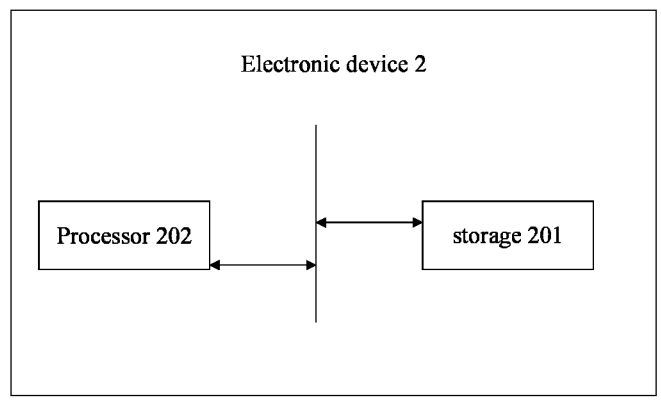
FIG. 2 is a schematic diagram of one embodiment of an electronic device.

FIG. 2 illustrates the electronic device 2. The electronic device 2 includes a storage 201, and a processor 202. A computer program is stored in the storage 201, and can be executed by the processor 202.

Those skilled in the art can understand that the schematic diagram shown in FIG. 2 is only an example of the electronic device 2, and does not constitute a limitation on the electronic device 2. Other examples may include more or less components than those shown in the drawings, or have different combinations of components, or different components, for example, the electronic device 2 may also include input and output devices, network access devices, buses, and the like.

The at least one processor 202 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 202 can be a microprocessor or the at least one processor 202 can also be any conventional processor, etc. The at least one processor 202 is the control center of the electronic device 2, using various interfaces and lines to connect various parts of the entire electronic device 2, and can hold an operating system of the electronic device 2 and various installed applications, program codes, etc.

The storage 201 can be used to store the computer program, and the at least one processor 202 implements the electronic program by executing the computer program stored in the storage 201 and calling up the data stored in the storage 201. The storage 201 may include an area for stored programs and an area for stored data, wherein the stored program area may store an operating system, an application program required for at least one function (such as a sound playback function, an image playback function, etc.), etc. The storage data area may store data (such as audio data) created according to the use of the electronic device 2, etc. In addition, the storage 201 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

The storage 201 may be an external memory and/or an internal memory of the electronic device 2. Further, the storage 201 may be a storage in physical form, such as a memory stick, a TF card (Trans-flash Card), etc.

In one embodiment, the modules/units integrated in the electronic device 2 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. A method for detecting defect of images comprising:
inputting flawless sample training images into an autoencoder of a defect detection model, and calculating first latent feature of the flawless sample training images by a coding layer of the autoencoder;
inputting the first latent feature into a decoding layer of the autoencoder, and calculating first reconstructed images of the flawless sample training images, and calculating a first reconstruction error between the flawless sample training images and the first reconstructed images by a first preset error function;
inputting the flawless sample training images and the first reconstructed images into a discriminator of the defect detection model, training the discriminator, and calculating an adversarial learning error between the discriminator and the autoencoder by a second preset error function;
calculating a sample error according to the first reconstruction error and the adversarial learning error;
determining an error threshold based on the sample error in response that the sample error satisfies a first preset condition;
obtaining testing sample images, inputting the testing sample images into the coding layer of the autoencoder after training, and calculating second latent feature of the testing sample images, and inputting the second latent feature into the decoding layer of the autoencoder after training, and calculating the second reconstructed images of the testing sample images, and calculating a difference between the testing sample images and the second reconstructed images by the first preset error function, and taking the difference as a second reconstruction error;
determining a detection result of the testing sample images according to the second reconstruction error and the error threshold.

2. The method as claimed in claim 1, wherein a step of calculating the first latent feature of the flawless sample training images by the coding layer of the autoencoder comprises:
performing vectorization processing on the flawless sample training images and obtaining feature vectors of the flawless sample training images, extracting the hidden layers corresponding to the coding layer;
calculating the feature vectors by the hidden layers and obtaining the first latent feature.

3. The method as claimed in claim 2, wherein a step of calculating the feature vectors by the hidden layers and obtaining the first latent feature comprises:
determining hidden layers of the coding layer of the autoencoder;
obtaining a weight matrix and bias values of the hidden layers;
multiplying the feature vectors and the weight matrix and obtaining an operation result;

adding the operation result and the bias values and obtaining the first latent feature.

4. The method as claimed in claim 1, wherein a step of calculating the first reconstructed images of the flawless sample training images comprises:
performing calculation on the first latent feature by the decoding layer of the autoencoder and obtaining intermediate vector;
performing restoration processing on the intermediate vector and obtaining the first reconstructed images.

5. The method as claimed in claim 1, wherein a step of training the discriminator comprises:
marking the flawless training sample images as true images and marking the first reconstructed images as false images;
training the discriminator to distinguish the true images and the false images;
in response that the discriminator cannot distinguish the true images and the false images, determining that a training process of the discriminator is completed, and that the training process of the autoencoder is completed.

6. The method as claimed in claim 1, wherein a step of calculating the sample error according to the first reconstruction error and the adversarial learning error comprises:
performing a weighted sum operation on the adversarial learning error and the first reconstruction error and obtaining the sample error.

7. The method as claimed in claim 1, wherein a step of determining an error threshold based on the sample error comprises:
collecting all sample errors, and sorting the sample errors in an ascending order, and obtaining a total list of the sample errors and a serial number of each sample error;
selecting one sample error from the total list according to a second preset condition as the error threshold.

8. The method as claimed in claim 1, wherein a step of determining a detection result of the testing sample images according to the second reconstruction error and the error threshold comprises:
in response that the second reconstruction error is greater than or equal to the error threshold, determining that the testing sample images have defects; or
in response that the second reconstruction error is less than the error threshold, determining that the testing sample images have no defects.

9. An electronic device comprising:
a processor; and
a non-transitory storage medium coupled to the processor and configured to store a plurality of instructions, which cause the processor to:
input flawless sample training images into an autoencoder of a defect detection model, and calculate first latent feature of the flawless sample training images by a coding layer of the autoencoder;
input the first latent feature into a decoding layer of the autoencoder, and calculate first reconstructed images of the flawless sample training images, and calculate a first reconstruction error between the flawless sample training images and the first reconstructed images by a first preset error function;
input the flawless sample training images and the first reconstructed images into a discriminator of the defect detection model, train the discriminator, and calculate an adversarial learning error between the discriminator and the autoencoder by a second preset error function;
calculate a sample error according to the first reconstruction error and the adversarial learning error;
determine an error threshold based on the sample error in response that the sample error satisfies a first preset condition;
obtain testing sample images, input the testing sample images into the coding layer of the autoencoder after training, and calculate second latent feature of the testing sample images, and input the second latent feature into the decoding layer of the autoencoder after training, and calculate the second reconstructed images of the testing sample images, and calculate a difference between the testing sample images and the second reconstructed images by the first preset error function, and take the difference as a second reconstruction error;
determine a detection result of the testing sample images according to the second reconstruction error and the error threshold.

10. The electronic device as claimed in claim 9, wherein the plurality of instructions are further configured to cause the processor to:
perform vectorization processing on the flawless sample training images and obtain feature vectors of the flawless sample training images, extract the hidden layers corresponding to the coding layer;
calculate the feature vectors by the hidden layers and obtain the first latent feature.

11. The electronic device as claimed in claim 10, wherein the plurality of instructions are further configured to cause the processor to:
determine hidden layers of the coding layer of the autoencoder;
obtain a weight matrix and bias values of the hidden layers;
multiply the feature vectors and the weight matrix and obtain an operation result;
add the operation result and the bias values and obtain the first latent feature.

12. The electronic device as claimed in claim 9, wherein the plurality of instructions are further configured to cause the processor to:
perform calculation on the first latent feature by the decoding layer of the autoencoder and obtain intermediate vector;
perform restoration processing on the intermediate vector and obtain the first reconstructed images.

13. The electronic device as claimed in claim 9, wherein the plurality of instructions are further configured to cause the processor to:
mark the flawless training sample images as true images and mark the first reconstructed images as false images;
train the discriminator to distinguish the true images and the false images;
in response that the discriminator cannot distinguish the true images and the false images, determine that a training process of the discriminator being completed, and that the training process of the autoencoder is completed.

14. The electronic device as claimed in claim 9, wherein the plurality of instructions are further configured to cause the processor to::
perform a weighted sum operation on the adversarial learning error and the first reconstruction error and obtaining the sample error.

15. The electronic device as claimed in claim 9, wherein the plurality of instructions are further configured to cause the processor to:

collect all sample errors, and sorting the sample errors in an ascending order, and obtain a total list of the sample errors and a serial number of each sample error;

select one sample error from the total list according to a second preset condition as the error threshold.

16. The electronic device as claimed in claim 9, wherein the plurality of instructions are further configured to cause the processor to:

in response that the second reconstruction error is greater than or equal to the error threshold, determine that the testing sample images have defects; or in response that the second reconstruction error is less than the error threshold, determine that the testing sample images have no defects.

17. A non-transitory storage medium having stored thereon instructions that, in response that executed by at least one processor of an electronic device, causes the least one processor to execute instructions of a method for detecting defect of images, the method comprising:

inputting flawless sample training images into an autoencoder of a defect detection model, and calculating first latent feature of the flawless sample training images by a coding layer of the autoencoder;

inputting the first latent feature into a decoding layer of the autoencoder, and calculating first reconstructed images of the flawless sample training images, and calculating a first reconstruction error between the flawless sample training images and the first reconstructed images by a first preset error function;

inputting the flawless sample training images and the first reconstructed images into a discriminator of the defect detection model, training the discriminator, and calculating an adversarial learning error between the discriminator and the autoencoder by a second preset error function;

calculating a sample error according to the first reconstruction error and the adversarial learning error;

determining an error threshold based on the sample error in response that the sample error satisfies a first preset condition;

obtaining testing sample images, inputting the testing sample images into the coding layer of the autoencoder after training, and calculating second latent feature of the testing sample images, and inputting the second latent feature into the decoding layer of the autoencoder after training, and calculating the second reconstructed images of the testing sample images, and calculating a difference between the testing sample images and the second reconstructed images by the first preset error function, and taking the difference as a second reconstruction error;

determining a detection result of the testing sample images according to the second reconstruction error and the error threshold.

18. The non-transitory storage medium as recited in claim 17, wherein a step of calculating the first latent feature of the flawless sample training images by the coding layer of the autoencoder comprises:

performing vectorization processing on the flawless sample training images and obtaining feature vectors of the flawless sample training images, extracting the hidden layers corresponding to the coding layer;

calculating the feature vectors by the hidden layers and obtaining the first latent feature.

19. The non-transitory storage medium as recited in claim 18, wherein a step of calculating the feature vectors by the hidden layers and obtaining the first latent feature comprises:

determining hidden layers of the coding layer of the autoencoder;

obtaining a weight matrix and bias values of the hidden layers;

multiplying the feature vectors and the weight matrix and obtaining an operation result;

adding the operation result and the bias values and obtaining the first latent feature.

20. The non-transitory storage medium as recited in claim 17, wherein a step of calculating the first reconstructed images of the flawless sample training images comprises:

performing calculation on the first latent feature by the decoding layer of the autoencoder and obtaining intermediate vector;

performing restoration processing on the intermediate vector and obtaining the first reconstructed images.

* * * * *